(12) United States Patent
Maker et al.

(10) Patent No.: US 11,165,215 B2
(45) Date of Patent: Nov. 2, 2021

(54) PURGING SYSTEM FOR A LASER SYSTEM

(71) Applicant: M SQUARED LASERS LIMITED, Strathclyde (GB)

(72) Inventors: Gareth Thomas Maker, Strathclyde (GB); Simon Munro, Strathclyde (GB)

(73) Assignee: M Squared Lasers Limited, Glasgow (GB)

( * ) Notice: Subject to any disclaimer, the term of this patent is extended or adjusted under 35 U.S.C. 154(b) by 0 days.

(21) Appl. No.: 15/752,645

(22) PCT Filed: Aug. 22, 2016

(86) PCT No.: PCT/GB2016/052595
§ 371 (c)(1),
(2) Date: Feb. 14, 2018

(87) PCT Pub. No.: WO2017/032994
PCT Pub. Date: Mar. 2, 2017

(65) Prior Publication Data
US 2018/0241169 A1  Aug. 23, 2018

(30) Foreign Application Priority Data
Aug. 21, 2015  (GB) ..................... 1514930

(51) Int. Cl.
*H01S 3/02* (2006.01)
*H01S 3/109* (2006.01)
*H01S 3/16* (2006.01)
*G02B 27/00* (2006.01)
*H01S 3/03* (2006.01)

(52) U.S. Cl.
CPC .......... *H01S 3/027* (2013.01); *G02B 27/0006* (2013.01); *H01S 3/03* (2013.01); *H01S 3/109* (2013.01); *H01S 3/1625* (2013.01)

(58) Field of Classification Search
CPC ...................................... H01S 3/027
See application file for complete search history.

(56) References Cited

U.S. PATENT DOCUMENTS 4,229,709 A * 10/1980 McMahan ............. H01S 3/0346
372/33
4,316,157 A  2/1982 Dosi et al.
(Continued)

FOREIGN PATENT DOCUMENTS

GB    437139 A    2/1935
JP    H07-106667  4/1995

*Primary Examiner* — Tod T Van Roy
(74) *Attorney, Agent, or Firm* — FisherBroyles, LLP

(57) ABSTRACT

A purging system for a laser system is described. The purging system comprising a cartridge that houses a desiccant material and which is configured for removable mounting with an enclosure of the laser system. The cartridge comprising a first mesh layer that provides a means for a fluid to flow to the desiccant material housed within the cartridge. The purging system further comprises a membrane located over the first mesh layer. The purging system therefore provides a mean for passively purging the laser system and so its operation does not require the employment of a pump. The employment of the removable cartridge also has the advantage that the downtimes of the laser system with which it is deployed are reduced during periods when it is required to dry or replace the desiccant material.

23 Claims, 4 Drawing Sheets

(56) References Cited

U.S. PATENT DOCUMENTS

| | | | |
|---|---|---|---|
| 6,170,167 B1 * | 1/2001 | Kato | G02B 27/0006 34/80 |
| 6,671,303 B1 | 12/2003 | Pang | |
| 6,816,536 B2 * | 11/2004 | Julliard | B65D 81/266 372/109 |
| 2003/0103545 A1 * | 6/2003 | Julliard | B65D 81/266 372/109 |
| 2004/0052285 A1 * | 3/2004 | Matsui | H01S 3/0941 372/75 |
| 2005/0013329 A1 * | 1/2005 | Pang | H01S 3/027 372/18 |

* cited by examiner

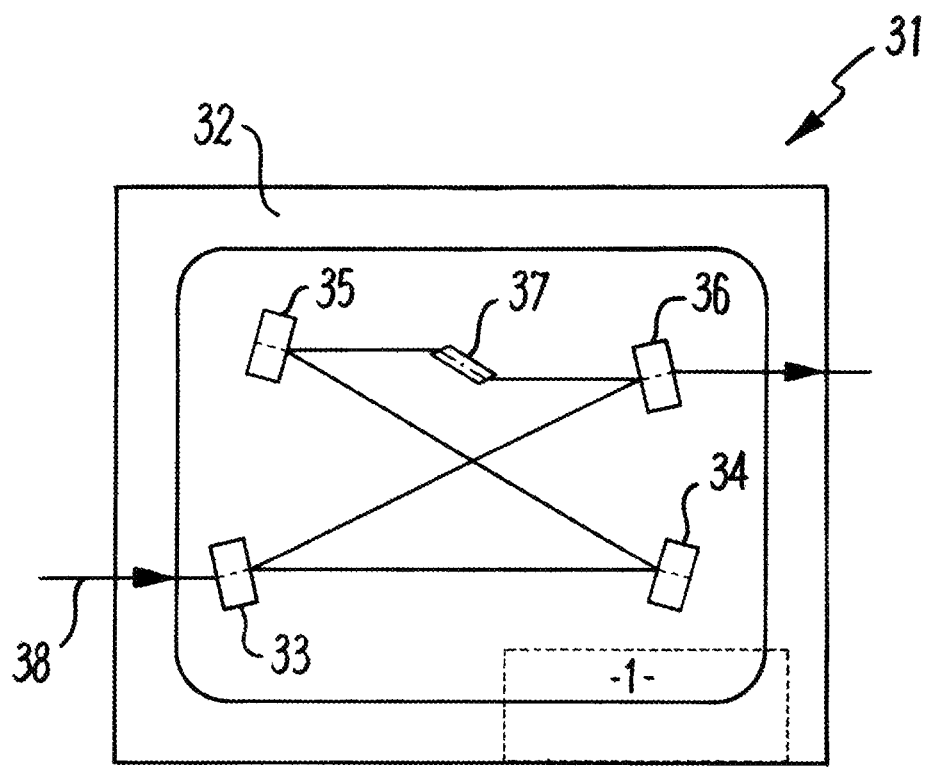
_Fig. 5_

PURGING SYSTEM FOR A LASER SYSTEM

This application is the U.S. national phase of International Application No. PCT/GB2016/052595 filed Aug. 22, 2016, which designated the U.S. and claims priority to GB Patent Application No. 1514930.5 filed Aug. 21, 2015, the entire contents of each of which are hereby incorporated by reference.

The present invention relates to the field of optics. More specifically, the present invention relates to purging system for a laser system which finds particular application with a laser resonator (e.g. an enclosure surrounding an ultrafast laser resonator) or an optical field enhancement cavity.

Ultrafast lasers are generally regarded as being lasers that deliver output radiation in pulses having a duration from about 100 picoseconds (ps) down to a few femtoseconds (fs). One common ultrafast laser is a Ti:Sapphire laser, which can be arranged to deliver output radiation at wavelengths between about 700 nanometers (nm) and about 1000 nm. The pulses delivered often have a relatively low energy but can exhibit very high peak powers in certain locations in a resonator.

If left unchecked, these very high peak powers delivered by such lasers can rapidly cause contamination and or damage to optical components located within the resonator. Contamination and or damage to the optical components may be exacerbated by defects on or within optical surfaces of the components. Accordingly, it is common for such components to comprise one or more protective optical coatings.

It is known in the art that such optical coatings can themselves be contaminated and or damaged due to the presence of particulate matter, condensates, vapours, or the like present within the resonator.

In order to address the issue of these problematic contaminants it is not unusual for commercial laser manufactures to assemble lasers in clean-room conditions. In these circumstances the optical resonator of the laser is located within an enclosure sufficiently sealed to minimise the ingress of particulate and vapour contaminants. The enclosure is then generally purged, before sealing e.g. with filtered dry nitrogen, dry air or the like.

In order to further increase the operating lifetimes of these commercial lasers it is known for such systems to incorporate a closed-loop purging system, see for example U.S. Pat. Nos. 6,671,303, 6,798,813 and 7,239,656. The described closed-loop purging systems employ a pump to initially extract gas from the enclosure housing the resonator. The extracted gas is then passed through a purging system comprising a desiccant, an organic vapour trapping material, and a particulate matter filter. Finally the purged extracted gas is then returned to the enclosure housing the resonator.

After a period of operation, depending on the ambient atmosphere in which laser is located, or the conditions of operation of the laser, it is known that the desiccant material will become saturated with water vapour. At this time a series of valves are employed to stop the normal operation of the closed-loop purging system and a drying gas is then directed to the desiccant material in order to attempt to revive or regenerate this material.

Laser systems which employ the above described closed-loop purging systems exhibit a number of disadvantages. In the first instance the drying procedure for the desiccant material can result in significant downtimes. In addition the efficiency of the desiccant material can deteriorate and thus need to be completely replaced. Complete replacement of the desiccant material is not easily achieved with such closed-loop purging system and the unskilled operator can often inadvertently expose the enclosure housing of the resonator to the surrounding atmosphere.

A second disadvantage of the above described closed-loop purging systems is their dependence on a dedicated pump in order to operate. Such components add to the complexity and overall cost of operating and manufacture of such laser systems.

The cost of such systems is further increased due to the requirement to incorporate the organic vapour trapping material and the particulate matter filter within the closed loop and a separate integrated system for drying the desiccant material.

It is therefore an object of an aspect of the present invention to obviate or at least mitigate the foregoing disadvantages of the closed-loop purging systems for laser resonators known in the art.

SUMMARY OF INVENTION

According to a first aspect of the present invention there is provided a purging system for a laser system the purging system comprising a cartridge that houses a desiccant material and which is configured for removable mounting with an enclosure of the laser system wherein the cartridge comprising a first mesh layer that provides a means for a fluid to flow to the desiccant material housed within the cartridge and wherein the purging system further comprises a membrane located over the first mesh layer.

The purging system therefore provides a mean for passively purging an optical cavity or resonator of the laser system since the operation does not require the employment of a pump. The employment of the removable cartridge also has the advantage that the downtimes of the laser system with which it is deployed are reduced during periods when it is required to dry or replace the desiccant material.

The desiccant material preferably comprises a solid getter material. Preferably the desiccant material comprises silica.

The purging system may comprise a frame that locates the membrane over the first mesh layer. The frame preferably allows the membrane to remain in position when the cartridge is removed from the enclosure.

The membrane preferably comprises pores having a diameter of the order of 0.2 microns. Preferably the membrane is made from Polytetrafluoroethylene (PTFE).

Preferably the purging system further comprises a fluid detector. The fluid detector is employed to provide a means for measuring the fluid content within the internal volume of the enclosure. The fluid detector preferably comprises a hygrometer.

The purging system may further comprise a fluid recirculation circuit the fluid recirculation circuit comprising a conduit for attachment to an output valve of the cartridge and a pump that provides a means for pumping a fluid from the output valve. In this embodiment the purging system provides a mean for actively purging the laser resonator.

Preferably the fluid recirculation circuit further comprises a filter unit located within the conduit that provides a means for filtering particulate material. The filter unit may comprise a high-efficiency particulate arrestance (HEPA) filter.

Preferably the fluid recirculation circuit further comprises an organic vapour trapping filter located within the conduit. The organic vapour trapping filter is preferably located between the output valve and the filter unit and provides a means for trapping organic vapours.

The fluid recirculation circuit may further comprise a valve located within the conduit. The valve may be employed to provide a means for connecting an inert gas supply to the conduit.

According to a second aspect of the present invention there is provided a laser system the laser system comprising a purging system in accordance with the first aspect of the present invention.

Most preferably the laser system comprises a cavity located with an enclosure of the laser system and suitable for housing the cartridge and the membrane.

Optionally the laser system comprises an inlet valve suitable for attachment to the conduit of the fluid recirculation circuit.

The laser system may comprise a Ti:Sapphire laser system. Alternatively, the laser system may comprise an optical field enhancement cavity. The purging system may however be employed with any laser system that would be affected by the presence of water vapour.

Embodiments of the second aspect of the invention may comprise features to implement the preferred or optional features of the first aspect of the invention or vice versa.

According to a third aspect of the present invention there is provided a method of purging a laser system the method comprising:
 removably mounting a cartridge with an enclosure of the laser system to establish a fluid flow from an internal volume of the enclosure to a desiccant material housed within the cartridge;
 locating a membrane within the fluid flow the membrane being located between the cartridge and the laser resonator.

The above described method thus provides a means for passively purging the enclosure of the laser system.

Most preferably the cartridge is removably mounted within a cavity located within the enclosure.

Preferably locating the membrane between the cartridge and the laser resonator comprise locating the membrane within a frame located within the cavity.

The method of purging a laser system may further comprise monitoring a fluid content within the internal volume of the enclosure. Most preferably the monitored fluid is water vapour.

The method of purging a laser system may further comprise re-circulating a fluid extracted from the cartridge back into the internal volume of the enclosure. In this embodiment the purging system provides a mean for actively purging the enclosure of the laser system.

Optionally particulate material is filtered from the re-circulated fluid.

Optionally organic vapour is filtered from the re-circulated fluid.

Optionally the method of purging a laser system may comprise supplying the internal volume of the enclosure with an inert gas.

Embodiments of the third aspect of the invention may comprise features to implement the preferred or optional features of the first or second aspects of the invention or vice versa.

BRIEF DESCRIPTION OF DRAWINGS

There will now be described, by way of example only, various embodiments of the invention with reference to the drawings, of which:

FIG. 5 presents a top view of an alternative laser system comprising the purging system of FIGS. 1 and 2.

Figure 1:
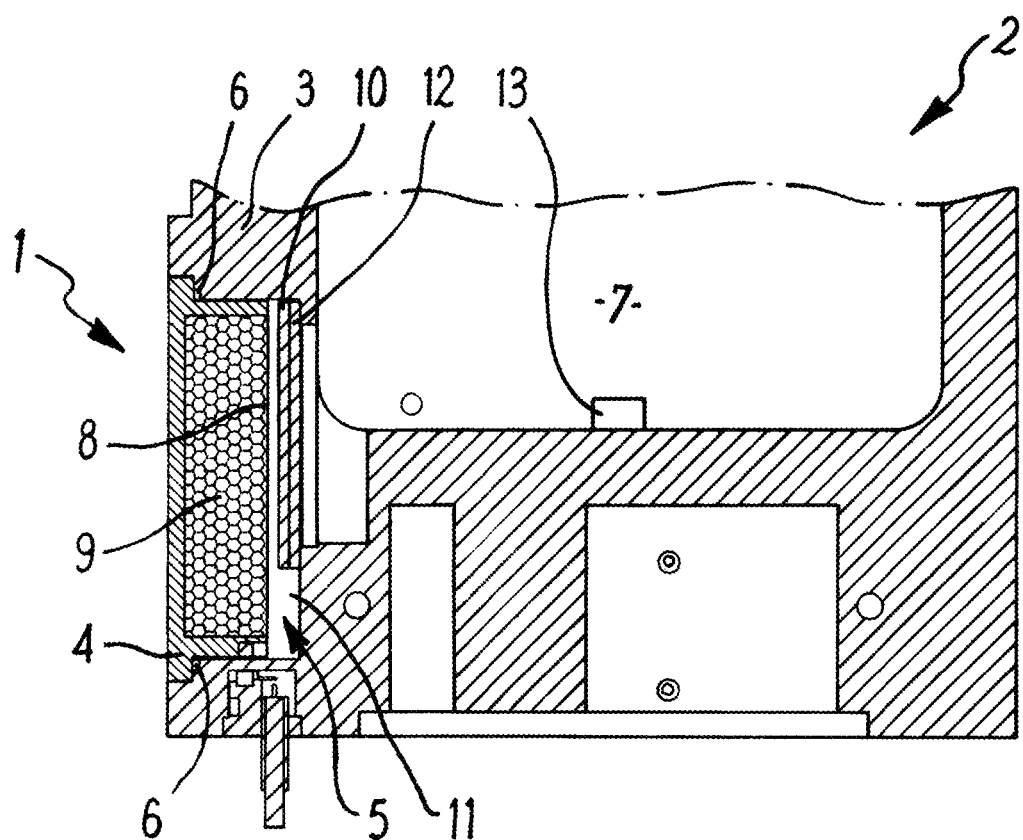
FIG. 1 presents a top view of a purging system for a laser resonator in accordance with an embodiment of the present invention.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION

Figure 2:
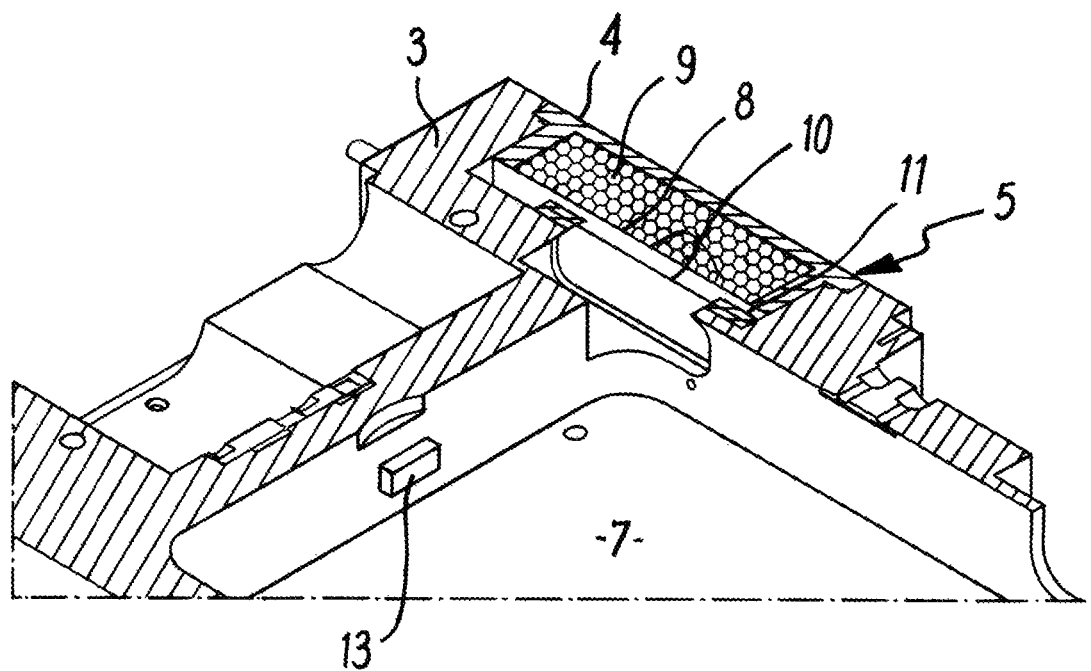
FIG. 2 presents an isometric view of the purging system of FIG. 1.

A purging system 1 for a laser system 2 will now be described with reference to FIGS. 1 and 2. In particular, FIGS. 1 and 2 present a top view and an isometric view, respectively, of the purging system 1 located within an enclosure 3 of a laser system 2, in accordance with an embodiment of the present invention.

The purging system 1 can be seen to comprise a cartridge 4 that is removably mounted within a cavity 5 formed in the enclosure 3. The cartridge 4 may be made of metal or any other suitable material. In the presently described embodiment four screws 6 are employed to retain the cartridge 4 within the cavity 5 of the enclosure 3. It will be appreciated that any other mechanical means, such as clasps and or an interference fit, or combinations thereof may alternatively be employed to retain the cartridge 4 within the cavity 5 of the enclosure 3.

The distal side of the cartridge 4 (i.e. the side that locates in fluid communication with the internal volume 7 of the enclosure 3) comprises a first mesh layer 8. The function of the first mesh layer 8 is two-fold. In the first instance the first mesh layer 8 is employed to retain a desiccant material 9 within the cartridge 4. The first mesh layer 8 is also employed to provide a means to allow for a fluid (e.g. air) to pass through via the effects of diffusion from the internal volume 7 of the enclosure 3 to the desiccant material 9 contained therein.

The desiccant material 9 preferably comprises any appropriate solid getter material. Preferably the desiccant material 9 comprises silica.

The purging system 1 can be seen to further comprise a membrane 10 that is held within a frame 11 of the enclosure 3 so as to locate between the cartridge 4 and the internal volume 7 of the enclosure 3 when in use. The membrane 10 preferably comprises pores having a diameter of the order of 0.2 microns. Preferably the membrane is made from Polytetrafluoroethylene (PTFE).

A second mesh layer 12 may be employed to provide physical protection to the membrane 10. The second mesh layer 12 also allows for a fluid (e.g. air) to pass through via the effects of diffusion from the internal volume 7 of the enclosure 3 towards the desiccant material 9 contained within the cartridge 4. The membrane 10 therefore provides a means for protecting the internal volume 7 of the enclosure 3 from particulate (e.g. dust) while limiting fluids from passing into the internal volume 7 of the enclosure 3 when the cartridge 4 is removed from the cavity 5.

The purging system 1 may further comprise a fluid detector 13. The fluid detector 13 is employed to provide a means for measuring the fluid content within the internal volume 7 of the enclosure 3. Preferably the fluid detector 13 comprise a hygrometer employed to measure the water moisture content within the internal volume 7 of the enclosure 3.

Figure 3:
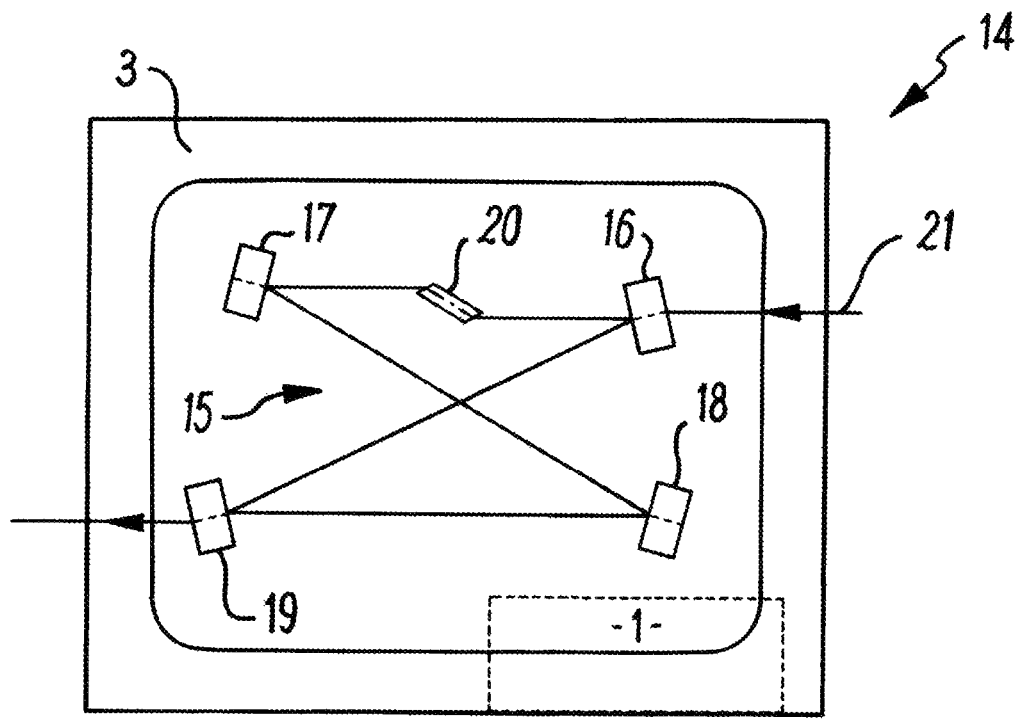
FIG. 3 presents a top view of a laser system comprising the purging system of FIGS. 1 and 2.

By way of example, FIG. 3 presents a top view of a Ti:Sapphire laser system 14 comprising the purging system 1 of FIGS. 1 and 2. A laser resonator 15 of the laser system 14 exhibits a substantially bow-tie ring cavity geometry defined by a first mirror 16, a second mirror 17, a third mirror 18, and an output coupler 19 all of which are located within the mechanically stable enclosure 3. Located within the resonator 15, between the first 16 and second 17 mirrors is a Ti:Sapphire gain medium 20. The Ti:Sapphire gain medium 20 is optically pumped via the first mirror 16 by pump beam 21.

As is known to those skilled in the art the resonator 15 may comprise further optical components in order to provide operation in a unidirectional manner and to allow for wavelength selection and scanning.

Given that the optical absorption within Ti: Sapphire occurs over a broad wavelength range from ~400 nm to ~600 nm, the gain medium 20 can be optically pumped by any commercially available continuous-wave "green" laser e.g. a 532 nm diode pumped solid-state laser source (not shown). In the presently described embodiment pumping of the gain medium 20 takes place through the first mirror 16.

During the operation of the Ti:Sapphire laser system 14 the purging system 1 acts in a passive mode of operation. In this mode of operation fluids, e.g. water vapour, diffuses through the second mesh layer 12, the membrane 10 and the first mesh layer 8 so as to come into contact with the desiccant material 9 where it is absorbed.

The fluid detector 13 may then be employed to monitor water moisture content within the internal volume 7 of the enclosure 3. When the monitored value of the water moisture content rises above a predetermined value then this indicates to an operator that that the desiccant material 9 has become saturated and therefore needs to be revived or replaced.

It will be recognised that the employment of the cartridge 4 makes this process relatively simple for the operator. The operator is simply required to remove the cartridge 4 from the cavity 5. At this stage the cartridge 4 can be placed in an oven so as to heat the desiccant material 9 and thus dry it out so that it can be redeployed for use within the purging system 1. As described above, the membrane 10 provides a means for protecting the internal volume 7 of the enclosure 3 from particulate (e.g. dust) while also limiting fluids from passing into the internal volume 7 of the enclosure 3 when the cartridge 4 is temporarily removed from the cavity 5.

It will be appreciated that a second cartridge 4 may be substituted into the purging system 1 while the first cartridge 4 is being dried so as to minimise the time the purging system 1 is required to rely on the protection provided to the internal volume 7 of the enclosure 3 by the membrane 10.

An alternative embodiment of the purging system 1b will now be described with reference to FIG. 4. The purging system 1b can be seen to comprise many features in common with the above described purging system 1b and thus like reference numerals are employed to denote like components.

Figure 4:
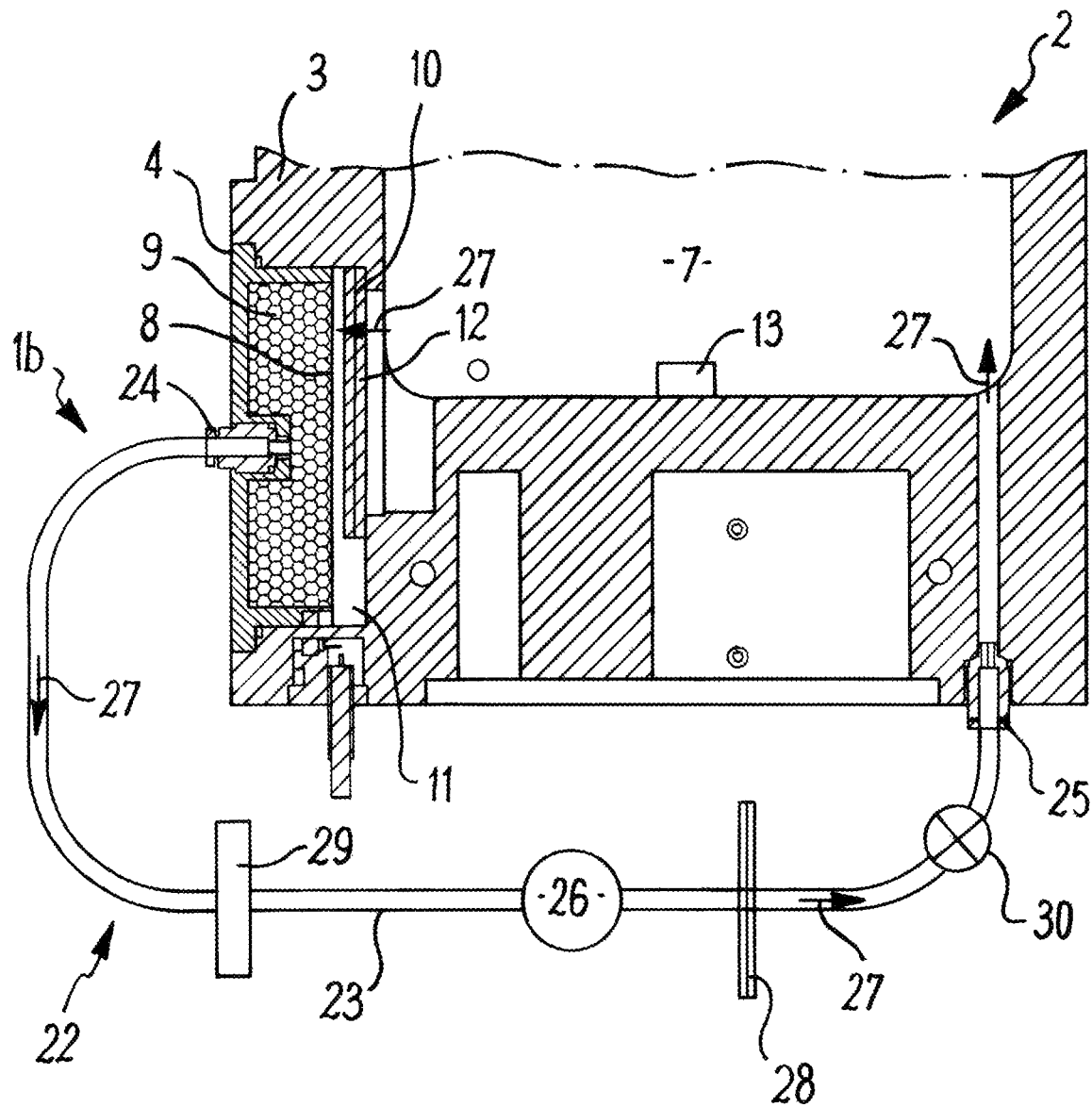
FIG. 4 presents a top view of an alternative purging system for a laser system.

As can be seen from FIG. 4, purging system 1b further comprises a recirculation circuit 22. The recirculation circuit 22 comprises a conduit 23 located between an output valve 24, located on the proximal side of the cartridge 4, and an input valve 25 located within the a side wall of the enclosure 3. The recirculation circuit 22 therefore provides a means for fluid communication to be established between the cartridge 4 and the internal volume 7 of the enclosure 3 when both of the output valve 24 and the input valve 25 are in their open positions.

The recirculation circuit 22 further comprises a pump 26 located within the conduit 23. The pump 26 provides a means for pumping a fluid (e.g. air) from the internal volume 7 of the enclosure 3.

The purging system 1b acts in an active mode of operation when both of the output valve 24 and the input valve 25 are in their open positions and the pump 26 is activated. At this time the volume of fluid within the internal volume 7 of the enclosure 3 is re-circulated in the direction indicated by the arrow 27 through the purging system 1b thus reducing the time taken to purge the laser resonator 15.

Preferably the recirculation circuit 22 further comprises a filter unit 28 located within the conduit 23. The filter unit 28 provides a means for filtering particulate material. The filter unit 28 is preferably capable of trapping particles having a size around 0.5 microns and greater so as to minimise the chance of particulate material from the desiccant material 9 being introduced into the internal volume 7 of the enclosure 3. The filter unit 28 may comprise a high-efficiency particulate arrestance (HEPA) filter.

Preferably the recirculation circuit 22 further comprises an organic vapour trapping filter 29 located within the conduit 23. The organic vapour trapping filter 29 is preferably located between the output valve 24 and the filter unit 28 and provides a means for trapping organic vapours released from materials such as adhesives, elastomer seals and any plastic materials used in the construction of the enclosure 3.

A third valve 30 may be located within the conduit 23. The third valve 30 may be employed to provide a means for connecting an inert gas supply (not shown) to the conduit 23. As a result a means for introducing a purging gas (e.g. nitrogen gas) to the internal volume 7 of the enclosure 3 is provided.

It will be recognised by the skilled reader that the purging system 1b may be operated in a passive mode of operation by closing the output valve 24 and the input valve 25 and deactivating the pump 26.

By way of further example, FIG. 5 presents a top view of an alternative laser system 31 comprising the purging system 1 of FIGS. 1 and 2. In this embodiment the laser system 31 comprises an optical field enhancement cavity 32 that exhibits a substantially bow-tie ring cavity geometry defined by a first mirror 33, a second mirror 34, a third mirror 35, and an output coupler 36 all of which are located within the mechanically stable optical cavity 31. Located within the resonator 31, between the third mirror 35 and the output coupler 36 is a non-linear crystal 37. The non-linear crystal 37 is optically pumped via the first mirror 16 by an optical input beam 38 that is to be enhanced by the non-linear crystal 37. It will be appreciated by the skilled reader that the non-linear crystal 37 and the optical pump beam 38 may be selected from the numerous combinations of non-linear crystals 37 and optical pump beams 38 known in the art.

As is also known to those skilled in the art the optical cavity 31 may comprise further optical components.

The purging systems described above exhibit a number of advantages over those systems known in the art. In the first instance they significantly reduce the downtimes of the laser system required to complete the drying procedure of the desiccant material. In addition the described purging systems facilitate easy replacement of the desiccant material as and when required thus reducing the risk of an unskilled operator inadvertently exposing the enclosure housing the resonator to the surrounding atmosphere.

A second advantage of the above described purging systems is that they do not require a dedicated pump in order to operate. This reduces the complexity and overall cost of operating and manufacturing laser systems incorporating this apparatus. In addition not having a pump reduces optical noise induced upon the on the laser system 2.

The cost of such systems is further reduced due to the fact that they no longer require the incorporation of an organic vapour trapping material, a particulate matter filter within the closed loop or a separate integrated system for drying the desiccant material.

A purging system for a laser system is described. The purging system comprising a cartridge that houses a desiccant material and which is configured for removable mounting with an enclosure of the laser system. The cartridge comprising a first mesh layer that provides a means for a fluid to flow to the desiccant material housed within the cartridge. The purging system further comprises a membrane located over the first mesh layer. The purging system therefore provides a mean for passively purging the laser system and so its operation does not require the employment of a pump. The employment of the removable cartridge also has the advantage that the downtimes of the laser system with which it is deployed are reduced during periods when it is required to dry or replace the desiccant material.

Throughout the specification, unless the context demands otherwise, the terms "comprise" or "include", or variations such as "comprises" or "comprising", "includes" or "including" will be understood to imply the inclusion of a stated integer or group of integers, but not the exclusion of any other integer or group of integers.

Furthermore, reference to any prior art in the description should not be taken as an indication that the prior art forms part of the common general knowledge.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A purging system suitable for a laser system, the purging system comprising:
   a cartridge which is removably mechanically mounted within a cavity formed within a wall of an enclosure of the laser system;
   a desiccant material housed within the cartridge, wherein only a single side of the cartridge comprises a first mesh layer that retains the desiccant material within the cartridge and that provides a means for a fluid to flow to the desiccant material housed within the cartridge when the cartridge is mounted within the cavity; and
   a membrane located within the cavity that locates over the first mesh layer when the cartridge is mounted within the cavity, wherein in use the purging system provides only a single membrane between the internal volume of the enclosure and the desiccant material, and wherein the single membrane remains in position in the cavity when the cartridge is removed from the cavity.

2. A purging system as claimed in claim 1 wherein the desiccant material comprises a solid getter material.

3. A purging system as claimed in claim 1 wherein the purging system comprises a frame that locates the membrane over the first mesh layer.

4. A purging system as claimed in claim 1 wherein the membrane comprises Polytetrafluoroethylene (PTFE).

5. A purging system as claimed in claim 1 wherein the purging system further comprises a fluid detector.

6. A purging system as claimed in claim 5 wherein the fluid detector comprises a hygrometer.

7. A purging system as claimed in claim 1 wherein the purging system further comprises a fluid recirculation circuit the fluid recirculation circuit comprising a conduit for attachment to an output valve of the cartridge and a pump that provides a means for pumping a fluid from the output valve.

8. A purging system as claimed in claim 7 wherein the fluid recirculation circuit further comprises a filter unit located within the conduit that provides a means for filtering particulate material.

9. A purging system as claimed in claim 8 wherein the filter unit comprises a high-efficiency particulate arrestance (HEPA) filter.

10. A purging system as claimed in claim 7 wherein the fluid recirculation circuit further comprises an organic vapour trapping filter located within the conduit.

11. A purging system as claimed in claim 10 wherein the organic vapour trapping filter is located between the output valve and the filter unit and provides a means for trapping organic vapours.

12. A purging system as claimed in claim 7 wherein the fluid recirculation circuit further comprises a valve located within the conduit.

13. A laser system comprising a purging system as claimed in claim 1.

14. A laser system as claimed in claim 13 wherein the laser system comprises an inlet valve suitable for attachment to a conduit of a fluid recirculation circuit.

15. A purging system as claimed in claim 1 wherein the cartridge is removably mechanically mounted within the cavity formed in the enclosure of the laser system by an interference fit.

16. A method of purging a laser system the method comprising:
   providing a cartridge having a first mesh layer located on only a single side of the cartridge,
   removably mechanically mounting the cartridge within a cavity formed within a wall of an enclosure of the laser system to establish a fluid flow via the first mesh layer from an internal volume of the enclosure to a desiccant material housed within the cartridge, wherein the first mesh layer retains the desiccant material within the cartridge;
   locating a membrane within the cavity to locate the membrane within the fluid flow from the internal volume of the enclosure to the desiccant material, wherein in use the purging system provides only a single membrane between the internal volume of the enclosure and the desiccant material, and wherein the single membrane remains in position when the cartridge is removed from the cavity.

17. A method of purging a laser system as claimed in claim 16 wherein locating the membrane within the fluid flow comprises locating the membrane within a frame located within the cavity.

18. A method of purging a laser system as claimed in claim 16 wherein the method further comprises monitoring a fluid content within the internal volume of the enclosure.

19. A method of purging a laser system as claimed in claim 18 wherein the monitored fluid is water vapour.

20. A method of purging a laser system as claimed in claim 16 wherein the method further comprises re-circulating a fluid extracted from the cartridge back into the internal volume of the enclosure.

21. A method of purging a laser system as claimed in claim 20 wherein particulate material is filtered from the re-circulated fluid.

22. A method of purging a laser system as claimed in claim 20 wherein organic vapour is filtered from the re-circulated fluid.

23. A method of purging a laser system as claimed in claim 16 wherein the method comprises supplying the internal volume of the enclosure with an inert gas.

* * * * *